US010205908B2

United States Patent
Hui et al.

(10) Patent No.: US 10,205,908 B2
(45) Date of Patent: *Feb. 12, 2019

(54) MULTI-MEDIA QUALITY OF SERVICE AND QUALITY OF USER EXPERIENCE OPTIMIZATION THROUGH VOICE PRIORITIZATION

(71) Applicant: T-Mobile USA, Inc., Bellevue, WA (US)

(72) Inventors: Jie Hui, Mercer Island, WA (US); Ahmad Arash Obaidi, San Ramon, CA (US); Sayeedur Rahman, Issaquah, WA (US); Pablo Tapia, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/729,521

(22) Filed: Oct. 10, 2017

(65) Prior Publication Data
US 2018/0035079 A1 Feb. 1, 2018

Related U.S. Application Data

(63) Continuation of application No. 14/310,742, filed on Jun. 20, 2014, now Pat. No. 9,819,904.

(51) Int. Cl.
*H04N 7/14* (2006.01)
*H04L 29/06* (2006.01)
(Continued)

(52) U.S. Cl.
CPC ......... *H04N 7/147* (2013.01); *H04L 47/2416* (2013.01); *H04L 65/602* (2013.01); *H04L 65/80* (2013.01); *H04L 47/2433* (2013.01)

(58) Field of Classification Search
USPC ....... 348/14.01, 14.12, 25, 92, 384, 618, 69, 348/211.12, 471
See application file for complete search history.

(56) References Cited

U.S. PATENT DOCUMENTS

| | | | |
|---|---|---|---|
| 2003/0144004 A1* | 7/2003 | Canova, Jr. ........... | H04M 3/567 455/453 |
| 2011/0173249 A1 | 7/2011 | Lee et al. | |
| 2015/0113047 A1* | 4/2015 | Spencer .............. | H04L 67/2823 709/203 |

OTHER PUBLICATIONS

Office action for U.S. Appl. No. 14/310,742 dated Mar. 2, 2017, Hui et al., "Multi-Media Quality of Service and Quality of User Experience Optimization Through Voice Prioritization", 13 pages.
(Continued)

*Primary Examiner* — Yosef K Laekemariam
(74) *Attorney, Agent, or Firm* — Lee & Hayes, PC

(57) ABSTRACT

Techniques to optimize quality of service and quality of user experience for multi-media mobile applications are described. A traffic detection component detects the video and audio data components of a video call. Detection may be via a modified traffic detection component or via a software quality of service component exposing traffic detection component functionality to a multi-media application via an application programming interface. Based on available bandwidth for a session of the multi-media application and heuristics, video and audio data components may be placed in different contexts with different priorities. In the specific case of a video call, the video and audio data components are each associated with a quality of user experience threshold, which when available bandwidth fails to meet those thresholds, an optimizing heuristic to trigger the traffic detection component to change contexts and priorities of the video and audio data components.

20 Claims, 4 Drawing Sheets

(51) Int. Cl.
*H04L 12/853* (2013.01)
*H04L 12/851* (2013.01)

(56) References Cited

OTHER PUBLICATIONS

Office action for U.S. Appl. No. 14/310,742, dated Apr. 27, 2016, Hui et al., "Multi-Media Quality of Service and Quality of User Experience Optimization Through Voice Prioritization", 11 pages.
Office action for U.S. Appl. No. 14/310,742, dated Aug. 18, 2016, Hui et al., "Multi-Media Quality of Service and Quality of User Experience Optimization Through Voice Prioritization", 11 pages.
Office action for U.S. Appl. No. 14/310,742, dated Aug. 24, 2015, Hui et al., "Multi-Media Quality of Service and Quality of User Experience Optimization Through Voice Prioritization", 10 pages.

* cited by examiner

MULTI-MEDIA QUALITY OF SERVICE AND QUALITY OF USER EXPERIENCE OPTIMIZATION THROUGH VOICE PRIORITIZATION

CROSS-REFERENCE TO RELATED APPLICATION

This application is a continuation of and claims priority to U.S. patent application Ser. No. 14/310,742 entitled "Multi-Media Quality of Service and Quality of User Experience Optimization Through Voice Prioritization" filed on Jun. 20, 2014, which is incorporated herein by reference as if fully set forth below.

BACKGROUND

The recent history of cellular technology may be characterized as an evolution from voice only communications services to the addition of data communications services. Originally cellular technology was designed to mimic landlines and supported only transmitting audio data, specifically data representing the voices of parties in conversation. Cellular technology evolved from supporting analog data to digital data. Accordingly, cellular technology not only could support audio data representing audio ranges larger than that of voice, such as music, but could also support digital application data, such as data for electronic mail and internet access.

Because the heritages of voice data transmission and application data transmission are different, there have been a number of efforts to match audio communications technology and data communications technology. In particular, voice data historically was transmitted over switch networks, and application data historically was transmitted over packet networks. Counterexamples certainly exist. For example, voice data could be transmitted via voice over internet protocol ("VoIP") over a packet network. Similarly, data could be transmitted over a voice network using a modem.

Notwithstanding the aforementioned counterexamples, multi-media applications often make use of both audio and video data. Since there are scenarios where the audio data and the video data will be transmitted and received over audio communications technologies and data communications technologies respectively, the audio data and video data for the multi-media applications may become desynchronized, or have other discrepancies impacting the user's QoE.

Presently, cellular communications support smartphones and other devices that support not only audio communications but also a wide range of software multi-media applications utilizing data communications. Furthermore, user's expectations of quality have increased, such as in having television quality streaming of movies. However, present approaches for improving reception and rendering of audio and data do not take into account quality of user experience ("QoE") and/or quality of service ("QoS"). Specifically, audio and data reception and rendering neither takes into account optimizing communications network conditions ("QoS"), nor user's perception of quality of service ("QoE").

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Introduction

Quality of service ("QoS") is where communications network conditions are optimal or near optimal. Accordingly, audio and/or data intensive software applications on a terminal participating on the network would be expected to be optimal or near optimal correspondingly. For example, if a cell phone had excellent throughput to a local cellular tower, one would expect reception to be correspondingly excellent. However, network conditions are not always optimal, thus providers and vendors turn to Quality of user experience ("QoE"). Specifically, applications can be optimized in their presentation and rendering of received data to give users the impression, i.e. QoE resembling optimal conditions, regardless of the actual QoS. In this way, a terminal's or software application's sensitivity to poor QoS is reduced.

Figure 1:
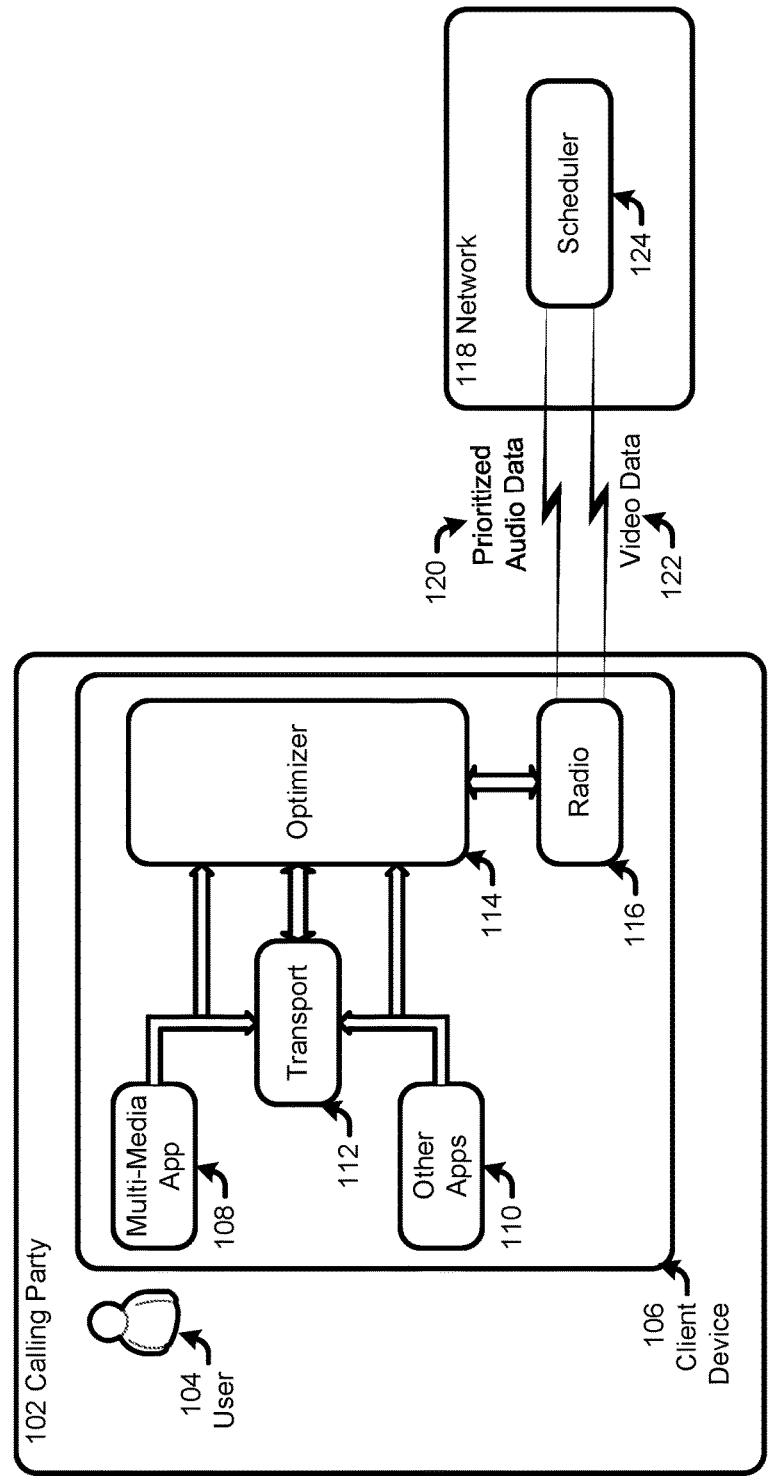
FIG. 1 is a top level diagram illustrating an exemplary architecture for achieving multi-media QoE and/or QoS.

Multi-media quality of service and quality of user experience through voice prioritization is disclosed herein. Specifically, a terminal includes an optimizer which classifies data into video data, audio data, and other data, and prioritizes scheduling to optimize QoE. FIG. 1 is a top level diagram 100 illustrating an exemplary architecture for achieving multi-media QoE and/or QoS.

Calling party 102 comprises a user 104 and a client device 106. A client device 106 is typically a terminal participating on a network. Examples of client device 106 include smartphones, networked laptop computers and networked tablet devices.

QoE is a function of the subjective impressions user 104 may have while executing multi-media applications 108 or other applications 110. Multi-media applications 108 are software applications that incorporate the rendering of some combination of text, audio, still pictures, and video. Multi-media applications 108 may be render-only applications such as a music player or video player. Alternatively, multi-media applications 108 may be bi-directional such as a video call, where both video and audio are transmitted for continuous communications. Other applications 110 may include data applications that may occasionally make use of multi-media, but do not primarily receive or render multi-media. Examples of other applications 110 include internet browsers which may navigate to websites with multi-media content; and electronic mail, which may have multi-media attachments.

Data for both multi-media applications 108 and other applications 110 typically pass through a communications transport 112, usually in the form of an implementation of a network communications stack. For example, client device 106 may have an implementation of transport control protocol/internet protocol ("TCP/IP") in software and/or hardware that constitutes communications transport 112. Data from the communications transport 112 is optimized via optimizer 114 which classifies data streams into different types and schedules to optimize QoE. Optimizer 114 is discussed in more detail with respect to FIG. 3.

Optimizer 114 is communicatively coupled to, or alternatively is integrated with a radio 116. Radio 116 participates on a network 118 such as an access network of a cellular network, and transmits and receives audio data 120 and video data 122. In FIG. 1, the audio data 120 may be prioritized per optimizer 114. However, the video data 122 may also be prioritized without loss of generality. In the network 118, a scheduler 124 may schedule routing of the audio data 120 and video data 122 according to priorities set by optimizer 114.

Note that radio 116 may be substituted for a network interface card if network 118 is a wired, rather than wireless network without loss of generality. In many cases, client device 106 will support both wired and wireless networks and may perform balancing between the two. By way of example, some laptops support cellular communications via a cellular modem, Wi-Fi, as well as wired Ethernet communications.

Exemplary Hardware Platform

Figure 2:
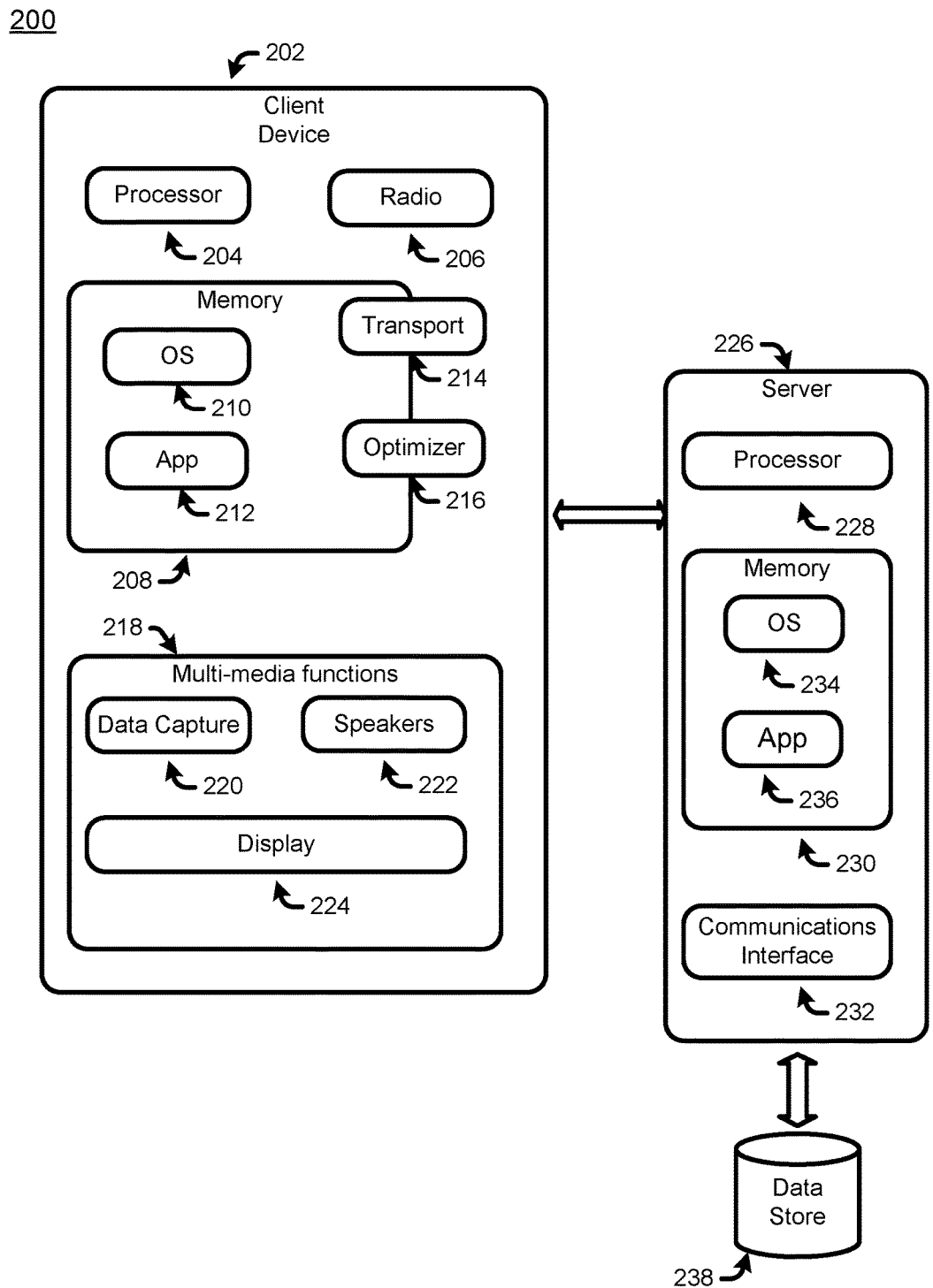
FIG. 2 is an exemplary hardware platform for achieving multi-media QoE and/or QoS.

FIG. 2 illustrates one possible embodiment of a hardware environment 200 for multi-media QoS and QoE through voice prioritization. Specifically FIG. 2 illustrates a client device 202 configured to categorize data streams into video, audio and other data streams and schedule to optimized QoE.

Client device 202 is any computing device with a processor 204 that may participate on a network. Network participation may be via radio 206 may support unlicensed spectrum communications such as Wi-Fi, or licensed spectrum such as WCDMA and CDMA2000. Alternatively, client device 202 may have multiple radios to support different communications transports. Where the network is a wired network, radio 206 may be supported by a network interface card.

Client device 202's memory 208 is any computer-readable media which may store several programs including an operating system 210, a software application 212. Software applications 212 include multi-media applications and other applications as described with respect to FIG. 1.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Client device 202 also has a network transport 214 and an optimizer 216 that works in conjunction with radio 206. Transport 214 and optimizer 216 may be partially implemented in hardware and partially in software. In this event, transport 214 and optimizer 216 may be partially resident in memory 208.

Client device 202 has a number of functions 218 to support multi-media. Functions include data capture facilities 220 such as a microphone, a still camera and/or a video camera. To render audio, client device 202 may have one or more speakers 222. To render stills and video, client device may have a hardware display 224. Data capture facilities 220, speakers 222 and display 224 may not be mutually exclusive. Indeed, many client devices 206 have all of these features, and some have multiple video cameras.

Client device 202 may communicate to a server 226. Server 230 is any computing device capable of receiving and routing data from client device 202. Server 226 comprises processor 228, memory 230 and communications interface 232. As per the preceding discussion regarding client 202, memory 234 is any computer-readable media including both computer storage media and communication media. Communications interface 232 may be a radio for a wireless network and/or a network interface card for a wired network.

Memory 230 stores programs 234, 236 which may include an operating system 234 and computer-readable instructions 236 to support routing and scheduling of data. Routing and scheduling are discussed in more detail with respect to FIG. 3.

Memory 230 may also store programs 236 that may include a database management system. Accordingly, server 230 may include data store 238. Data store 238 may be configured as a relational database, an object-oriented database, a columnar database, or any configuration to support video-call routing data.

Multi-Media QoS and QoE Optimization Through Voice Prioritization

Multi-media QoS and QoE optimization may be achieved in various ways, but ultimately, QoE is a function of a user's expectations. Software can be programmed to match those expectations. One scenario is where a user is engaged in a video call. Although the user is viewing his or her counterpart on the video, the user may be focused on what his or her counterpart is saying. Accordingly, discontinuities in voice reception may exaggerate a low quality connection. Conversely, excellent voice reception may compensate for poor video quality. In this way, a suggested heuristic would be to prioritize voice communications where there is insufficient network capacity for both voice and video in a video call.

Figure 3:
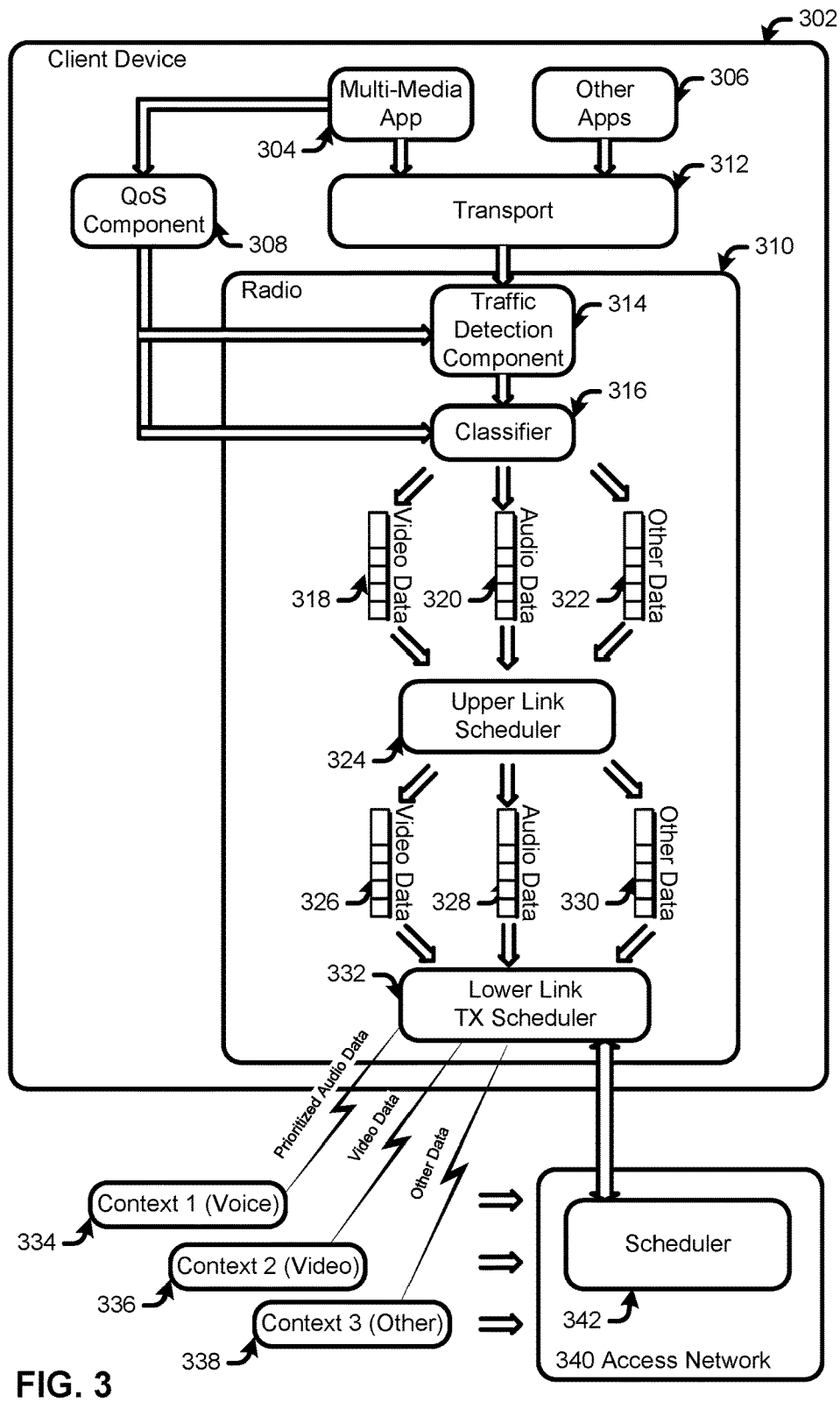
FIG. 3 is an exemplary diagram of data flow for achieving multi-media QoE and/or QoS.

FIG. 3 is an illustration 300 of multiple exemplary approaches for multi-media QoS and QoE optimization through voice prioritization. In one embodiment, a client device 302 hosts a multi-media application 304, potentially executing alongside another application 306 directly invokes a QoS component 308 outside of a radio 310. The QoS component 308 exposes an application programming interface ("API") that may be directly invoked by a multi-media application 304. In this way, multi-media QoS and QoE optimization through voice prioritization on client devices 302 that do not have such functionality integrated into radio 310. In another embodiment, a multi-media application 304 invokes a network transport 310, and a traffic detection component 314 integrated in radio 308 starts the QoS/QoE processing.

In both embodiments, a traffic detection component 314 measures available bandwidth for a network connection. Specifically, available bandwidth is network capacity to transmit and receive data. If the available bandwidth is sufficient for both video and voice, then no action is necessary. However, if bandwidth is not sufficient then the traffic detection component 314 may start the process to make tradeoffs. Measuring available bandwidth and determining sufficiency is discussed with respect to FIG. 4.

Data flowing through the traffic detection component 314 will proceed to the classifier 316. Classifier 316 will identify a session for a particular multi-media application 304. Specifically, classifier 316 will detect an instance of a network interaction for a particular multi-media application 304 whose data routing through the network should be sent to the same destination instance. For example, a video call client might support multiple concurrent video conversations, one to Joe, the other to Sue. A single conversation would correspond to a session, since although all video chat data would be routed to the video chat application, some video chat data would go to a particular instance constituting a video conversation with Joe, and other video chat data would go to a different instance constituting a different video conversation with Sue.

Upon detecting a session, classifier 316 will subdivide the session's data streams into video data 318, audio data 320 and other data 322. For a video call, the video data 318 is the video component of the data of the video call and the audio data 320 is the audio component, typically the voice component of the video call. An example of other data 322 may be metadata.

Either through input from QoS component 308 and/or determination by traffic detection component 314 and/or classifier 316, the video data 318, audio data 320 and other data 322 streams will associate prioritization information with the respective streams. Specifically the traffic detection component 314 and/or classifier 316 will have access to heuristics and optimization rules in memory that determines how to subdivide data streams and how to prioritize the subdivided data streams. Based on this prioritization, upper link scheduler 324 will schedule and route streams accordingly. The upper link scheduler 324 will then forward the prioritized streams to the lower link transmission scheduler 332 to determine which contexts 334, 336, 338 to transmit the prioritized video data 318, audio data 320 and other data 322.

Video data 318 will correspond to a video context 334, audio data will correspond to an audio context 336, and other data may correspond to another context 338. Alternatively, data might be combined to different contexts to meet optimization needs. As stated above, traffic detection component 314 and/or classifier 316 will access optimizations and heuristics as stored in memory. Specific optimizations and heuristics are described in more detail with respect to FIG. 4.

When the lower link transmission scheduler mapping streams 326, 328, 330 to contexts 334, 336, 338 with the priorities according to the desired optimization or heuristic, the access network 340 receives the data in contexts 334, 336, 338 and performs the scheduling with scheduler 342. The scheduler 342 may be a reverse link scheduler, i.e., a scheduler for the connection between a mobile terminal and a cellular base station.

Figure 4:
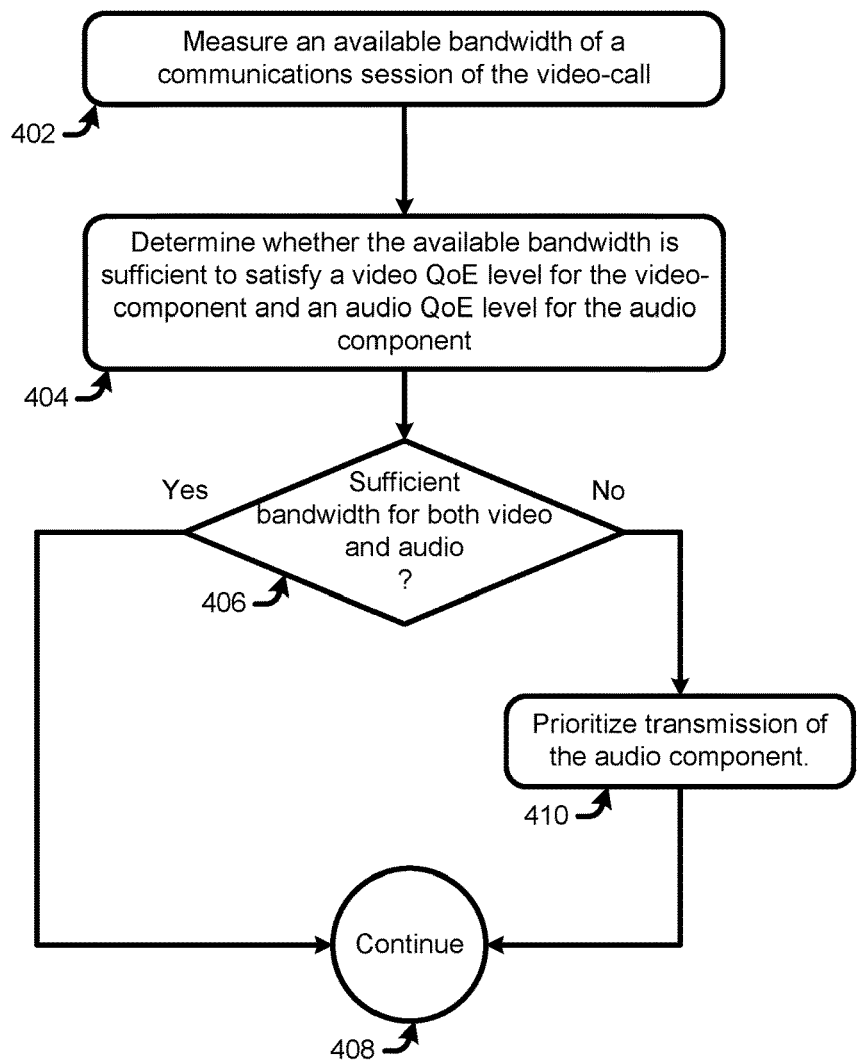
FIG. 4 is a flow chart of an exemplary process to perform multi-media QoE and/or QoS through voice prioritization.

Thresholds for Sufficiency for QoS and QoE Optimization Through Voice Prioritization While optimization techniques described herein need not be specific to voice prioritization, a specific use case is to optimize video call QoE by prioritizing voice data upon detection of insufficient bandwidth. FIG. 4 is a flowchart 400 of a particular application of the optimization techniques herein as applied to video call optimization.

A user may engage in a video call with another user. That call constitutes a session of a video call multi-media application as described above. A client device will have limited throughput and the client device's link to the network will also have limited throughput. Accordingly, the client device, potentially through a traffic detection component, may measure available bandwidth specific to the video call session in 402.

A traffic detection component may measure available bandwidth in several ways. It may receive channel information from the access network itself. Specifically, servers on the network may affirmatively transmit channel condition metrics to the client device and ultimately the traffic detection component. Alternatively, the traffic detection component may detect traffic conditions on client device itself. The traffic detection component may also measure transmission capacity of the client device. Exemplary transmission capacity measurements include power utilization level, physical transmission capacity, and throughput transmission capacity.

Each video call will have a video data component comprising the video of the video call, and an audio data component comprising the voice and potentially other audio data of the video call. A video call will have an acceptable QoE threshold level for the video data component and an acceptable QoE threshold level for the audio data component. The video and/or audio thresholds may be determined in several ways. One way is to have a preconfigured user setting specific to the video call application. In this way a user can determine whether to prioritize voice or video depending on the video call. The video call application may measure the video and/or audio QoE levels at run time during the call itself, and may detect periodic aberrations. In general, the video call application or a utility on the client device may dynamically generate video and/or audio QoE levels at run time. Dynamically generated QoE levels may be provided by the multi-media application to the traffic detection component and the classifier via the quality of service component's application programming interface.

In block 404, the traffic detection component or equivalent may determine whether the existing measured available bandwidth for the session is sufficient for the video call. Specifically, the available bandwidth for the session is compared to the QoE threshold levels for the video and audio data components. The traffic detection component and/or classifier may reference rules in memory to make this assessment. If the available bandwidth is sufficient, then execution continues without interruption.

If the measured available bandwidth is not sufficient, then the audio data component may be prioritized according to an optimizing heuristic. The following are some potential optimizing heuristics.

One optimization is to separate non-video call data from video-call data. Since video calls are expected by users to be continuous, video call data can be prioritized over non-video call asynchronous data applications such as electronic mail. Since data applications include video-call data, the packet non-video call data may be placed on a default bearer with normal priority and with a primary PDP context.

The video component of a video call will typically be packet switched data. The audio data will typically be circuit switched data. Circuit switching may be slower than packet switching. Accordingly, while it may be ideal to place the video call's video component on a dedicated second bearer with high priority, to match the need for continuous video, the circuit switched audio component of the video call may on a dedicated third bearer with highest priority, i.e. higher than the video component.

In general, it may be optimal to ensure that the packet-switched video-component data for the video-call and the circuit-switched audio-component data for the video-call are each on a separate secondary PDP context. As previously described, non-video call data may be separated from video call data by placing packet data for non-video-call applications are on a default bearer with normal priority and a primary PDP context. If separation of the non-video call data and the video call video component sufficiently relieves network congestion, then the video component of the video call may be on a default bearer with normal priority and the circuit-switched audio component data for the video call may be on a dedicated second bearer with highest priority. This approach may be further optimized by placing the packet-switched video-component data for the video-call and the circuit-switched audio component data for the video call each on a separate secondary PDP context for parallel processing.

Upon execution of these heuristics, the upper level scheduler and the lower level transmission scheduler will perform the optimizations as described with respect to FIG. 3.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of communication, comprising:
   measuring an available bandwidth of a communications session of a video-call comprising a video component and an audio component;
   determining whether the available bandwidth is sufficient to satisfy a video Quality of User Experience (QoE) level for the video component and an audio QoE level for the audio component; and
   based on determining that the available bandwidth is not sufficient to satisfy both the video QoE level and the audio QoE level, prioritizing transmission of the audio component over the video component by placing data for the audio component on a dedicated bearer with a highest priority and placing data for the video component on a second bearer with a lower priority than the highest priority level.

2. The method of claim 1, wherein the measuring the available bandwidth comprises: receiving channel information transmitted by an access network carrying the communications session of the video-call.

3. The method of claim 1, wherein the measuring the available bandwidth comprises: measuring a transmission capacity on a client device used for the video-call.

4. The method of claim 3, wherein measuring the transmission capacity comprises:
   determining a power utilization level;
   measuring a physical transmission capacity; and
   determining the transmission capacity, by limiting the physical transmission capacity based at least on the power utilization level.

5. The method of claim 1, wherein determining whether the available bandwidth is sufficient to satisfy the video QoE level and the audio QoE level further comprises:
   obtaining the video QoE level and the audio QoE level from a preconfigured user preference setting.

6. The method of claim 1, wherein the determining whether the available bandwidth is sufficient to satisfy the video QoE level and the audio QoE level further comprises:
   measuring at run time data requirements of a multi-media application; and
   dynamically generating the video QoE level and the audio QoE level.

7. The method of claim 6, wherein the measuring at run time the data requirements of the multi-media application comprises:
   receiving at a Quality of Service component a message from the multi-media application comprising the data requirements of the multi-media application, the data requirements comprising video data requirements and audio data requirements.

8. The method of claim 1, wherein the determining whether the available bandwidth is sufficient to satisfy the video QoE level and the audio QoE level further comprises:
   measuring at run time a set of data requirements of at least one multi-media application and a set of data requirements of at least one non-multi-media application; and
   dynamically generating the video QoE level and the audio QoE level based at least on a combination of the set of data requirements of at least one multi-media application and the set of data requirements of at least one non-multi-media application.

9. The method of claim 1, further comprising placing packet data for non-video-call applications on a bearer with a lower priority level than the dedicated bearer.

10. The method of claim 9, wherein the data for the video component is placed on a second dedicated bearer with a high priority and the packet data for the non-video-call applications is placed on a separate default bearer with normal priority.

11. The method of claim 1, wherein the data for the video component and the data for the audio component are placed on separate secondary PDP contexts.

12. The method of claim 8, wherein the measuring at run time the set of data requirements of at least one multi-media application and a set of data requirements of at least one non-multi-media application further comprises:
   measuring at a traffic detection component a data packet volume from a transport component, the data packet volume comprising a combination of video data packets and audio data packets from the at least one multi-media application and data packets from the at least one non-multi-media application.

13. The method of claim 9, wherein the data for the video component and the packet data for the non-video-call applications are both placed on a default bearer with normal priority.

14. The method of claim 1, wherein the video component comprises packet-switched data and the audio component comprises circuit-switched data.

15. The method of claim 9, wherein the packet data for the non-video-call applications is placed on a primary PDP context.

16. The method of claim 1, wherein the data for the audio component of the video-call is voice data.

17. The method of claim 1, wherein a reverse link scheduler in an access network performs scheduling according to the priorities of the dedicated bearer and second bearer.

18. A client device, comprising:
   a processor;
   a memory communicatively coupled to the processor;
   a video-call application resident in the memory, executable by the processor;
   a radio;
   a classifier component, operably connected to the radio, the classifier component being operable by the processor to subdivide data associated with a video-call into a video data stream and an audio data stream according to a plurality of classification rules resident in the memory; and at least one scheduler being operable by the processor to schedule and route the video data stream and the audio data stream by placing the video data stream and the audio data stream into different contexts having different priorities.

19. The client device of claim 18, further comprising a software Quality of Service (QoS) component which is programmatically accessible by the video-call application via an application programming interface ("API") to invoke the classifier component.

20. The client device of claim 18, further comprising a traffic detection component communicatively coupled to the radio, the traffic detection component being configured to measure available bandwidth for a network connection accessible through the radio and to invoke the classifier component when the available bandwidth is insufficient for both video and audio.

* * * * *